US012602339B2

(12) United States Patent
Escamilla et al.

(10) Patent No.: US 12,602,339 B2
(45) Date of Patent: Apr. 14, 2026

(54) STRAIN RELIEF FOR FLOATING CARD ELECTROMECHANICAL CONNECTOR

(71) Applicant: Dell Products L.P., Round Rock, TX (US)

(72) Inventors: Eduardo Escamilla, Round Rock, TX (US); Raymond D. Heistand, II, Round Rock, TX (US); Sanjiv C. Sinha, Austin, TX (US); Pei-Chuan Hsieh, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 87 days.

(21) Appl. No.: 18/448,359

(22) Filed: Aug. 11, 2023

(65) Prior Publication Data

US 2025/0053529 A1     Feb. 13, 2025

(51) Int. Cl.
G06F 13/36          (2006.01)

(52) U.S. Cl.
CPC .......... G06F 13/36 (2013.01); *G06F 2213/40* (2013.01)

(58) Field of Classification Search
None
See application file for complete search history.

(56) References Cited

U.S. PATENT DOCUMENTS 6,663,415 B1 * 12/2003 Wu .................... H01R 13/5808
                                                 439/906
12,213,278 B2 * 1/2025 Curtis ...................... H05K 7/10

2010/0003904 A1 * 1/2010 Duescher .............. B24B 37/245
                                                     51/293
2015/0378415 A1 * 12/2015 George ................... G06F 1/206
                                                     307/64
2016/0050786 A1 * 2/2016 Hartman .............. H05K 7/1417
                                                     29/829
2019/0010675 A1 * 1/2019 Ogawa .................. E02F 9/2282
2019/0011340 A1 * 1/2019 Collins, Sr. .............. B01L 9/06
2022/0160428 A1 * 5/2022 Murray .............. A61B 17/7086
2024/0023236 A1 * 1/2024 Curtis ................ H05K 7/20145
2024/0111726 A1 * 4/2024 Lakshmikantha .. G06F 16/1734
2024/0276664 A1 * 8/2024 Escamilla ............ H05K 7/1409
2024/0334632 A1 * 10/2024 Xiao ..................... H05K 5/0069

(Continued)

*Primary Examiner* — Henry Tsai
*Assistant Examiner* — Christopher A Bartels
(74) *Attorney, Agent, or Firm* — Jackson Walker L.L.P.

(57)          ABSTRACT

An information handling resource assembly may include an information handling resource implemented with a circuit board having a plurality of locating features formed therein, a receptacle connector having a plurality of mounting features, each of the mounting features formed at respective ends of the receptacle connector, and a housing for housing the information handling resource and the receptacle connector and comprising a plurality of standoffs extending from a surface of the housing, each particular standoff comprising a receiving feature for receiving a respective fastener, such that mechanical engagement of a plurality of fasteners wherein each respective fastener is passed through a respective locating feature of the plurality of locating features, passed through a respective mounting feature of the plurality of mounting features, and received by the receiving feature of the particular standoff mechanically loads the information handling resource and the receptacle connector in a fixed position relative to the housing.

18 Claims, 3 Drawing Sheets

(56) References Cited

U.S. PATENT DOCUMENTS

| 2024/0377863 | A1* | 11/2024 | Escamilla | ............... | G06F 1/185 |
| 2024/0381556 | A1* | 11/2024 | Chien | .................... | G06F 1/183 |
| 2025/0085750 | A1* | 3/2025 | Morrison | ............ | H05K 7/1402 |

* cited by examiner

STRAIN RELIEF FOR FLOATING CARD ELECTROMECHANICAL CONNECTOR

TECHNICAL FIELD

The present disclosure relates in general to information handling systems, and more particularly to systems and methods for providing strain relief for connectors in an information handling system, in particular floating card electromechanical (CEM) connectors.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems utilize one or more riser cards. A riser card is a printed circuit board that gives a motherboard of the information handling system the option for additional expansion cards to be added to the information handling system. Thus, a riser card is usually coupled to a motherboard receptacle connector via an edge connector, and may include one or more receptacle connectors mounted on the riser card to receive expansion cards in order to electrically couple such expansion cards to the motherboard. Accordingly, in general, the main purpose of a riser card may be to change the orientation of the expansion cards such that they fit a limited space within casing.

Increasingly, the one or more receptacle connectors mounted on a riser card are implemented using direct-attached or "floating" card electromechanical (CEM) connectors in which the receptacle connectors comprise cable terminations of cables routed through a cutout in the printed circuit board implementing the riser card, and wherein such cables are directly electrically coupled (e.g., soldered) to the receptacle connectors.

One disadvantage of the direct-attached receptacle connector is the cutout in the printed circuit board of the riser card, which results in a board that may be easily damaged if mounted conventionally with the connector mechanically mounted to the printed circuit board.

SUMMARY

In accordance with the teachings of the present disclosure, the disadvantages and problems associated with existing approaches to mechanically mounting a direct-attached cable connector to a riser card may be reduced or eliminated.

In accordance with embodiments of the present disclosure, an information handling system may include a motherboard and an information handling resource assembly mechanically and electrically coupled to the motherboard and comprising an information handling resource implemented with a circuit board having a plurality of locating features formed therein, a receptacle connector having a plurality of mounting features, each of the mounting features formed at respective ends of a length of the receptacle connector, and a housing for housing the information handling resource and the receptacle connector and comprising a plurality of standoffs extending from a surface of the housing, each particular standoff of the plurality of standoffs comprising a receiving feature for receiving a respective fastener, such that mechanical engagement of a plurality of fasteners wherein each respective fastener is passed through a respective locating feature of a plurality of locating features, passed through a respective mounting feature of a plurality of mounting features, and received by the receiving feature of the particular standoff mechanically loads the information handling resource and the receptacle connector in a fixed position relative to the housing.

In accordance with embodiments of the present disclosure, an information handling resource assembly may include an information handling resource implemented with a circuit board having a plurality of locating features formed therein, a receptacle connector having a plurality of mounting features, each of the mounting features formed at respective ends of a length of the receptacle connector, and a housing for housing the information handling resource and the receptacle connector and comprising a plurality of standoffs extending from a surface of the housing, each particular standoff of the plurality of standoffs comprising a receiving feature for receiving a respective fastener, such that mechanical engagement of a plurality of fasteners wherein each respective fastener is passed through a respective locating feature of the plurality of locating features, passed through a respective mounting feature of the plurality of mounting features, and received by the receiving feature of the particular standoff mechanically loads the information handling resource and the receptacle connector in a fixed position relative to the housing.

In accordance with embodiments of the present disclosure, a method for constructing an information handling assembly comprising may include mechanically coupling an information handling resource implemented with a circuit board having a plurality of locating features formed therein to a receptacle connector having a plurality of mounting features, each of the mounting features formed at respective ends of a length of the receptacle connector and mechanically coupling the information handling resource to a housing for housing the information handling resource and the receptacle connector and comprising a plurality of standoffs extending from a surface of the housing, each particular standoff of the plurality of standoffs comprising a receiving feature for receiving a respective fastener. M mechanically coupling comprises passing each respective fastener through a respective locating feature of the plurality of mounting features, passing each respective fastener through a respective mounting feature of the plurality of mounting features, and mechanically engaging the respective fastener to the receiving feature of the particular standoff to mechanically load the information handling resource and the receptacle connector in a fixed position relative to the housing.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
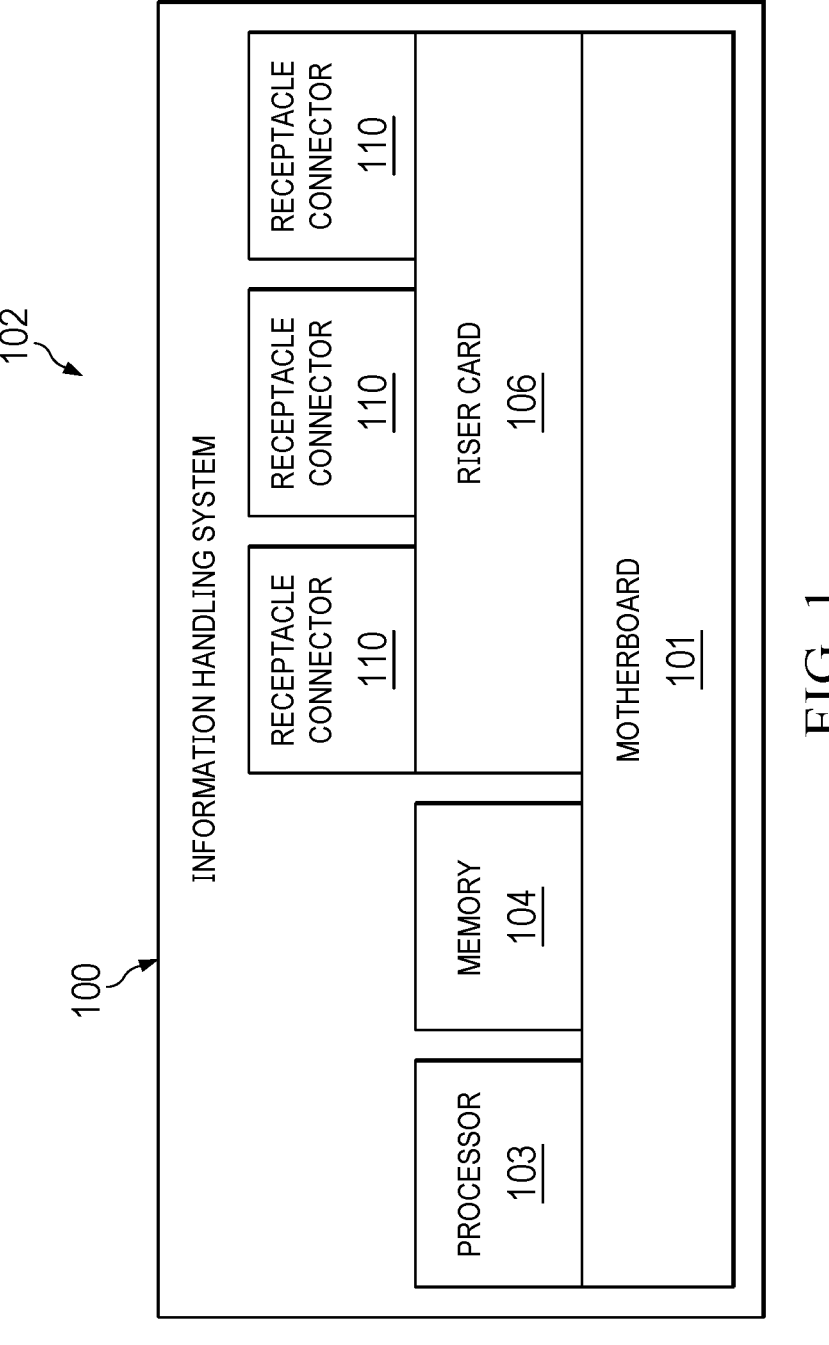
FIG. 1 illustrates a block diagram of selected components of an example information handling system, in accordance with embodiments of the present disclosure.
Figure 2A:
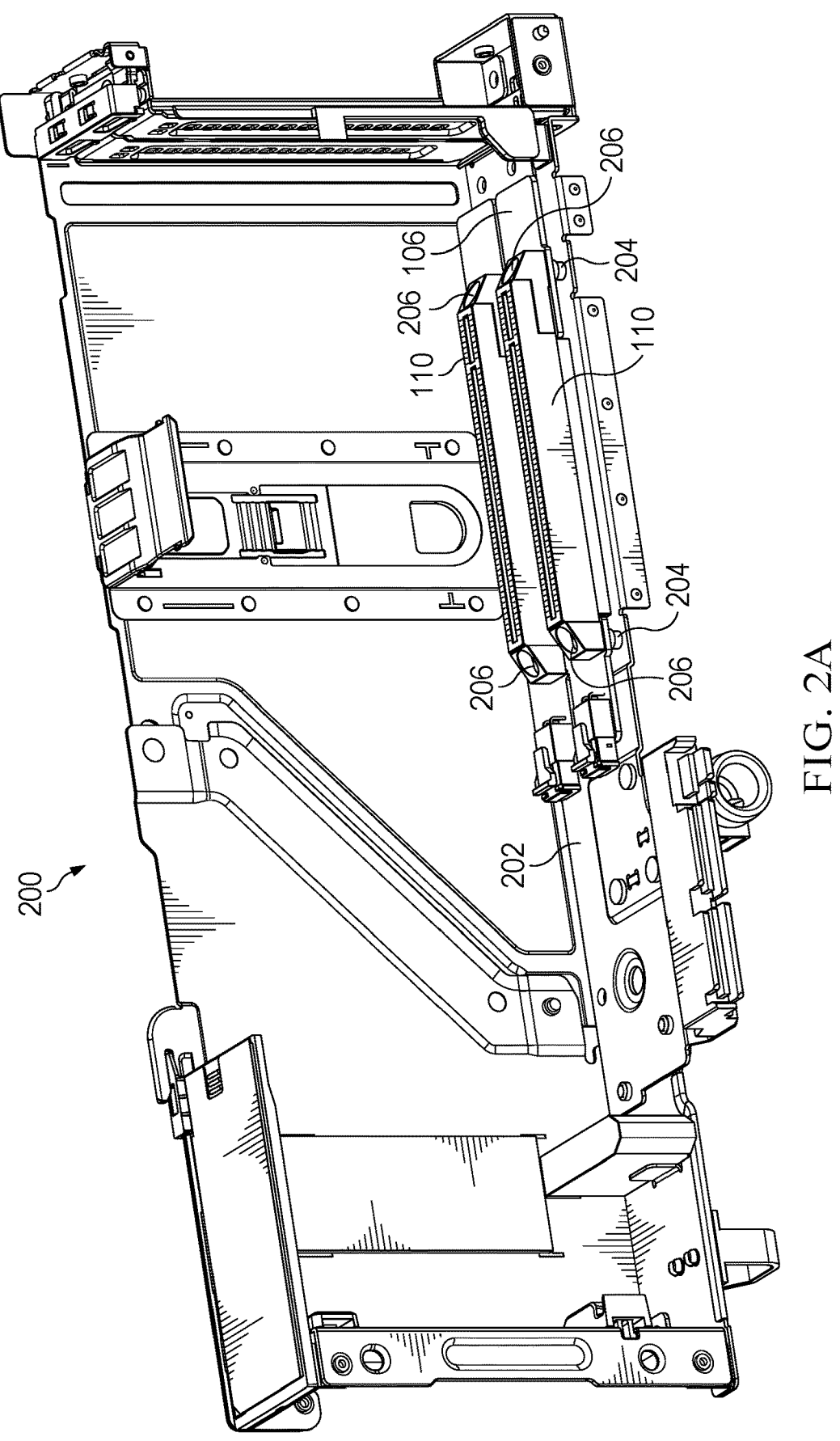
FIG. 2A illustrates a perspective assembled view of selected components of a riser assembly, in accordance with embodiments of the present disclosure.
Figure 2B:
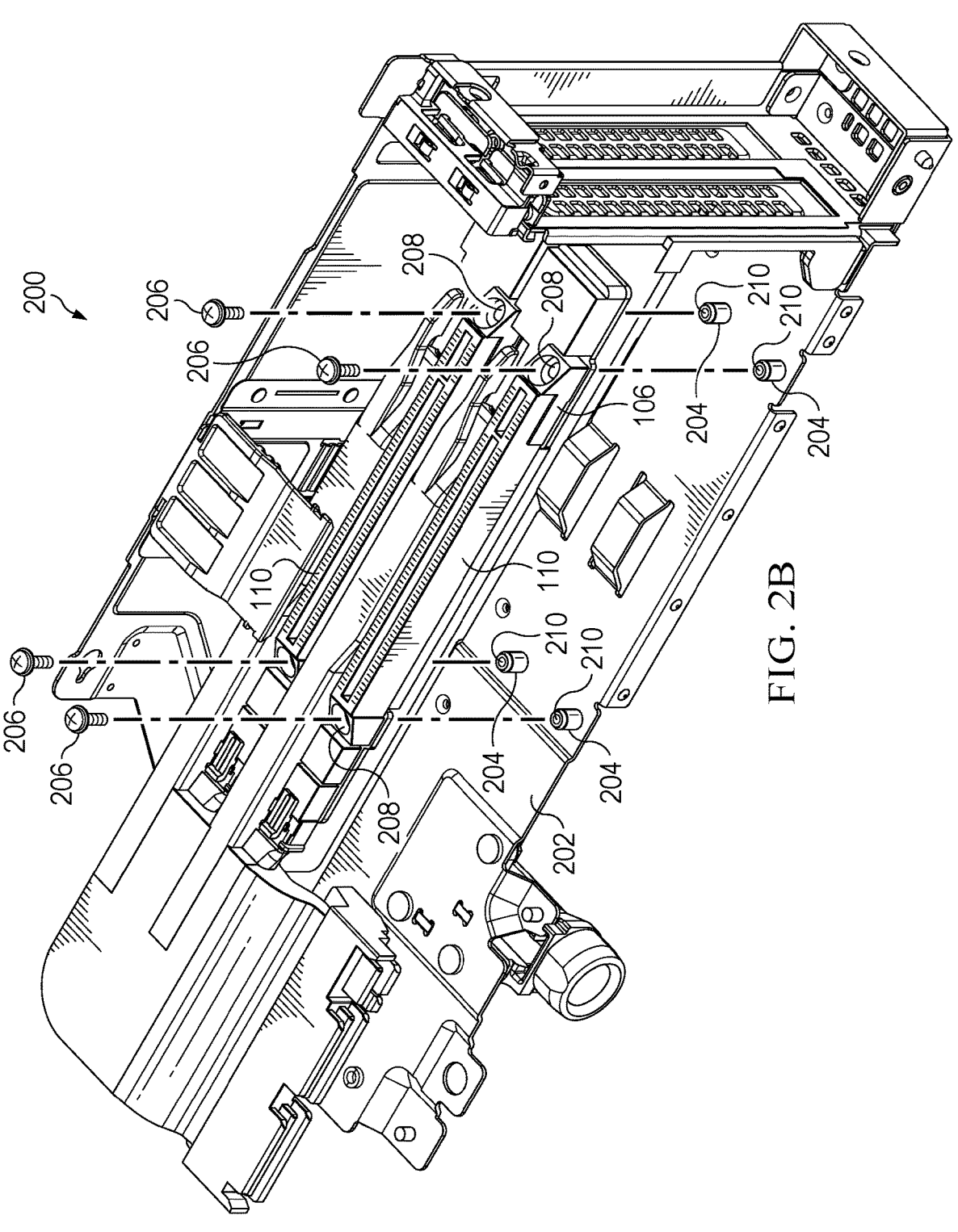
FIG. 2B illustrates a perspective exploded view of selected components of the riser assembly, in accordance with embodiments of the present disclosure.

Preferred embodiments and their advantages are best understood by reference to FIGS. 1, 2A, and 2B, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RA), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs), etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

FIG. 1 illustrates a block diagram of selected components of an example information handling system 102. In some embodiments, information handling system 102 may comprise a server. In other embodiments, information handling system 102 may comprise networking equipment for facilitating communication over a communication network. In yet other embodiments, information handling system 102 may comprise a personal computer, such as a laptop, notebook, or desktop computer.

As shown in FIG. 1, information handling system 102 may include a chassis 100 that houses a motherboard 101, a processor 103 coupled to motherboard 101, a memory 104 coupled to motherboard 101, a riser card 106 mechanically and electrically coupled to motherboard 101, and a plurality of receptacle connectors 110 mechanically coupled to riser card 106.

Chassis 100 may include any suitable housing or enclosure configured to house the various components of information handling system 102, and may be constructed from metal, plastic, and/or any other suitable material.

Motherboard 101 may comprise a circuit board configured to provide structural support for one or more information handling resources of information handling system 102 and/or electrically couple one or more of such information handling resources to each other and/or to other electric or electronic components external to information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a storage resource, memory system 104, and/or another component of information handling system 102.

Memory 104 may be communicatively coupled to processor 103 and may comprise any system, device, or apparatus operable to retain program instructions or data for a period of time (e.g., computer-readable media). Memory 104 may comprise random access memory (RAM), electrically erasable programmable read-only memory (EE-PROM), a PCMCIA card, flash memory, magnetic storage, opto-magnetic storage, or any suitable selection and/or array of volatile or non-volatile memory that retains data after power to information handling system 102 is turned off. In particular embodiments, memory 104 may comprise dynamic random access memory (DRAM).

A riser card 106 may comprise a circuit board enabling the option for additional expansion cards to be coupled to motherboard 101. Riser card 106 may be coupled to motherboard 101 via an edge connector (not explicitly shown in FIG. 1) that mechanically and electrically couples to a corresponding receptacle connector of motherboard 101 (not explicitly shown in FIG. 1).

A receptacle connector 110 may comprise any system, device, or apparatus fixedly mounted relative to riser card 106 and may be constructed to mechanically couple a corresponding expansion card (not explicitly shown in FIG. 1) within such receptacle connector 110 and to electrically couple such expansion card to motherboard 101, processor 103, and/or other components of information handling system 102. Connector 110 may comprise a socket including a receptacle slot or other opening configured to removably receive a corresponding mating edge connector of an expansion card.

In addition to motherboard 101, processor 103, memory 104, riser cards 106, and connectors 110, information handling system 102 may include one or more other information handling resources.

FIG. 2A illustrates a detailed perspective view of selected components of riser assembly 200, in accordance with embodiments of the present disclosure. FIG. 2B illustrates a perspective exploded view of selected components of riser assembly 200, in accordance with embodiments of the present disclosure.

As shown in FIGS. 2A and 2B, riser assembly 200 may include a housing 202 (e.g., constructed of metal, plastic, and/or other suitable material) configured to provide mechanical structure to various components of riser card 106, receptacle connectors 110, and other components associated with riser card 106.

As also shown in FIGS. 2A and 2B, housing 202 may comprise a plurality of mechanical standoffs 204 extending from housing 202. A mechanical standoff 204 may include any suitable mechanical structure having a mechanical feature that may offset riser card 106 from a wall of housing 202 by a particular distance and that may engage with corresponding locating features (e.g., openings or holes, not explicitly shown in FIGS. 2A and 2B) of riser card 106 in order to locate riser card 106 in a fixed position relative to housing 202.

As further shown in FIGS. 2A and 2B, a plurality (e.g., two) of fasteners 206 (e.g., threaded screws) may pass through a mounting feature 208 formed at opposite ends of the length of each connector 110, wherein, when riser card assembly 200 is assembled, each such fastener 206 may extend through a corresponding mounting feature 208, corresponding locating feature of riser card 106, and mechanically engage with a corresponding receiving feature 210 (e.g., threaded insert) formed in a corresponding standoff 204. Thus, as so assembled, the mechanical engagement of fasteners 206 with receiving features 210 may provide mechanical loading to mechanically couple connectors 110 and riser card 106 in a fixed position relative to housing 202.

Advantages of the methods and systems described above are that they may provide a simple and efficient approach to attaching CEM boards to a riser assembly. Such approaches may simplify the riser by minimizing part count and cost. Further, by mechanically loading connectors 110 to housing 202, strain relief may be provided for heavier expansion cards (e.g., graphics processing units). In addition, such approaches may provide efficient use of board area of riser card 106.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:

a motherboard; and an information handling resource assembly mechanically and electrically coupled to the motherboard and comprising:

an information handling resource implemented with a circuit board having a plurality of locating features formed therein;

a receptacle connector having a plurality of mounting features, each of the mounting features formed at respective ends of a length of the receptacle connector; and a housing for housing the information handling resource and the receptacle connector and comprising a plurality of standoffs extending from a surface of the housing, each particular standoff of the plurality of standoffs comprising a receiving feature for receiving a respective fastener, such that mechanical engagement of a plurality of fasteners wherein each respective fastener is passed through a respective locating feature of the plurality of locating features, passed through a respective mounting feature of the plurality of mounting features, and received by the receiving feature of the particular standoff mechanically loads the information handling resource and the receptacle connector in a fixed position relative to the housing, wherein the plurality of standoffs separate a surface of the information handling resource from a surface of the housing.

2. The information handling system of claim 1, wherein the information handling resource comprises a riser card.

3. The information handling system of claim 1, wherein the receptacle comprises a direct-attached card electromechanical connector terminating a cable.

4. The information handling system of claim 1, wherein:

the plurality of fasteners comprise a plurality of screws; and the plurality of receiving features comprises threaded inserts.

5. The information handling system of claim 1, wherein at least one locating feature of the plurality of locating features comprises a hole formed in the circuit board.

6. The information handling system of claim 1, wherein at least one mounting feature of the plurality of mounting features comprises a hole formed in the receptacle connector.

7. An information handling resource assembly comprising:

an information handling resource implemented with a circuit board having a plurality of locating features formed therein;

a receptacle connector having a plurality of mounting features, each of the mounting features formed at respective ends of a length of the receptacle connector; and a housing for housing the information handling resource and the receptacle connector and comprising a plurality of standoffs extending from a surface of the housing, each particular standoff of the plurality of standoffs comprising a receiving feature for receiving a respective fastener, such that mechanical engagement of a plurality of fasteners wherein each respective fastener is passed through a respective locating feature of the plurality of locating features, passed through a respective mounting feature of the plurality of mounting features, and received by the receiving feature of the particular standoff mechanically loads the information handling resource and the receptacle connector in a fixed position relative to the housing, wherein the plurality of standoffs separate a surface of the information handling resource from a surface of the housing.

8. The information handling resource assembly of claim 7, wherein the information handling resource comprises a riser card.

9. The information handling resource assembly of claim 7, wherein the receptacle comprises a direct-attached card electromechanical connector terminating a cable.

10. The information handling resource assembly of claim 7, wherein:

the plurality of fasteners comprise a plurality of screws; and the plurality of receiving features comprises threaded inserts.

11. The information handling resource assembly of claim 7, wherein at least one locating feature of the plurality of locating features comprises a hole formed in the circuit board.

12. The information handling resource assembly of claim 7, wherein at least one mounting feature of the plurality of mounting features comprises a hole formed in the receptacle connector.

13. A method for constructing an information handling resource assembly comprising:

mechanically coupling an information handling resource implemented with a circuit board having a plurality of locating features formed therein to a receptacle connector having a plurality of mounting features, each of the mounting features formed at respective ends of a length of the receptacle connector and mechanically coupling the information handling resource to a housing for housing the information handling resource and the receptacle connector and comprising a plurality of standoffs extending from a surface of the housing, each particular standoff of the plurality of standoffs comprising a receiving feature for receiving a respective fastener;

wherein mechanically coupling comprises passing each respective fastener through a respective locating feature of the plurality of mounting features, passing each respective fastener through a respective mounting feature of the plurality of mounting features, and mechanically engaging the respective fastener to the receiving feature of the particular standoff to mechanically load the information handling resource and the receptacle connector in a fixed position relative to the housing, wherein the plurality of standoffs separate a surface of the information handling resource from a surface of the housing.

14. The method of claim 13, wherein the information handling resource comprises a riser card.

15. The method of claim 13, wherein the receptacle comprises a direct-attached card electromechanical connector terminating a cable.

16. The method of claim 13, wherein:

the fasteners comprise a plurality of screws; and the receiving features comprise threaded inserts.

17. The method of claim 13, wherein at least one locating feature of the plurality of locating features comprises a hole formed in the circuit board.

18. The method of claim 13, wherein at least one mounting feature of the plurality of mounting features comprises a hole formed in the receptacle connector.

\* \* \* \* \*